(12) United States Patent
Wolbers

(10) Patent No.: US 8,202,421 B2
(45) Date of Patent: Jun. 19, 2012

(54) SMALL-VOLUME REVERSE OSMOSIS SYSTEM WITH DOUBLE-VALVE PERMEATE PUMP

(75) Inventor: Ralf Wolbers, Schüttorf (DE)

(73) Assignee: Wapura Trinkwasserreinigungs GmbH, Schuttorf (DE)

( * ) Notice: Subject to any disclaimer, the term of this patent is extended or adjusted under 35 U.S.C. 154(b) by 482 days.

(21) Appl. No.: 12/296,006

(22) PCT Filed: Apr. 3, 2007

(86) PCT No.: PCT/EP2007/053277
§ 371 (c)(1),
(2), (4) Date: Mar. 25, 2009

(87) PCT Pub. No.: WO2007/115986
PCT Pub. Date: Oct. 18, 2007

(65) Prior Publication Data
US 2009/0173676 A1    Jul. 9, 2009

(30) Foreign Application Priority Data

Apr. 4, 2006 (DE) .......................... 10 2006 015 674

(51) Int. Cl.
*B01D 61/12* (2006.01)
*B01D 61/06* (2006.01)
*B01D 61/08* (2006.01)

(52) U.S. Cl. ............... 210/321.65; 210/321.66; 210/134

(58) Field of Classification Search .................. None
See application file for complete search history.

(56) References Cited

U.S. PATENT DOCUMENTS

| 2,679,209 A | 5/1954 | Fischer et al. |
| 5,460,716 A | 10/1995 | Wolbers |
| 2003/0012668 A1 | 1/2003 | Simmons et al. |

FOREIGN PATENT DOCUMENTS

WO    WO 95/30472    11/1995

*Primary Examiner* — Krishnan S Menon
(74) *Attorney, Agent, or Firm* — Occhiuti Rohlicek & Tsao LLP

(57) ABSTRACT

In a small-volume reverse osmosis system with a reverse osmosis module, a concentrate line leading from the reverse osmosis module to an outlet line, a permeate line leading from the reverse osmosis module to a storage tank, as well as a permeate pump connected to the concentrate line and to the permeate line with a displacement unit and two control channels, the invention proposes that two valves that are alternately switched by the displacement unit (12) depending on the position be integrated into a joint control slide and control channel opening combination.

19 Claims, 4 Drawing Sheets

SMALL-VOLUME REVERSE OSMOSIS SYSTEM WITH DOUBLE-VALVE PERMEATE PUMP

CROSS-REFERENCE TO RELATED APPLICATIONS

Figure 1:
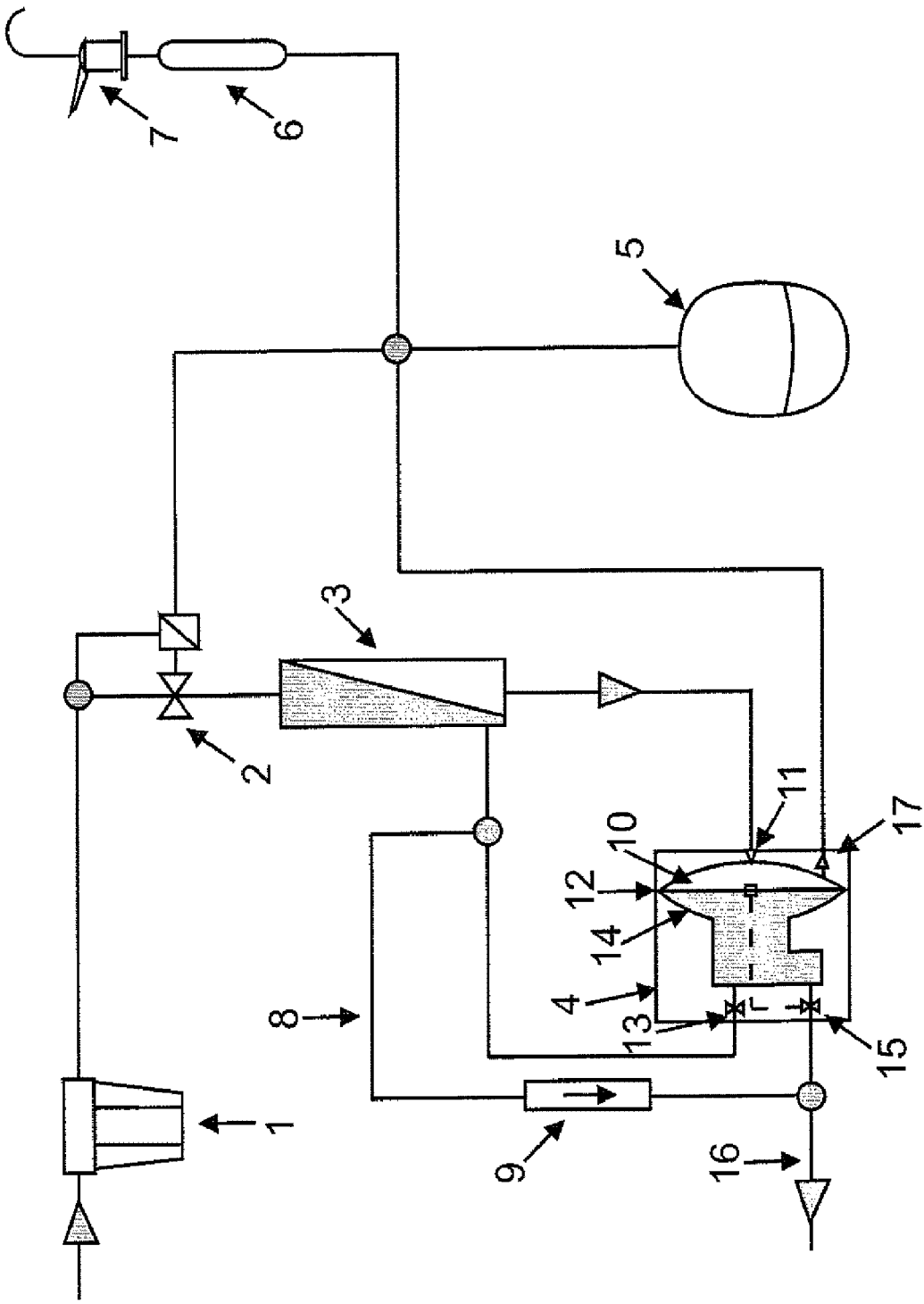

This application is the National Stage of International Application No. PCT/EP2007/053277, filed on Apr. 3, 2007, which claims the priority of German Application No. 10 2006 015 674.9, filed on Apr. 4, 2006. The contents of both applications are hereby incorporated by reference in their entirety.

The invention concerns a small-volume reverse osmosis system with a reverse osmosis module that is fitted with a diaphragm, and has a raw water inlet and a concentrate outlet, both arranged on the one side of the diaphragm, as well as a permeate outlet that is arranged on the reverse osmosis module on the other side of the diaphragm. To avoid the diaphragm becoming blocked, the reverse osmosis module must be regularly flushed through or must be operated with a permanent water surplus, so that the ratio of the permeate yield to the raw water volume is very low and the operation of the reverse osmosis system is correspondingly economically unfavourable. The yield is defined as the ratio of the discarded concentrate to the recoverable permeate, e.g. 1:1, or the ratio of the raw water used to the recoverable permeate, e.g. 50%. In these two examples, the yield is the same, because, in both cases, a raw water quantity of 100% is divided into 50% concentrate and 50% permeate. Small-volume systems typically work with a ratio of 3:1 and worse, which corresponds to a yield of 25% and less.

A small-volume system hereby refers to a so-called "Point of use"-system that is installed directly at the end-user, for example, in restaurants or private households, and that generates permeate volumes of around 20 to approximately 1,000 liters per day. A system of this kind is described, for example, in EP 0 567 751 B1.

In practice, reverse osmosis systems are known that are fitted with permeate pumps, whereby the permeate pumps are connected behind the concentrate regulator and are only fitted with one control valve at the drive output. The disadvantage here is that waste water can flow away unused through the concentrate regulator and the open control valve during the filling phase of the permeate chamber. High yields, for example of better than 2:1, are not possible, as the discharge time in the pump phase is too long and the backpressure that thereby builds up has a negative effect on the performance and efficiency of the reverse osmosis system.

In addition, the concentrate regulator must always be adapted to the output of the reverse osmosis module.

The invention is based on the object to create a reverse osmosis system that can be operated with the highest possible yield, with a built as simple as possible and that can be adapted to different permeate outputs as easily as possible.

The invention thereby proposes a small-volume reverse osmosis system with a reverse osmosis module, a concentrate line leading from the reverse osmosis module to an outlet line, a permeate line leading from the reverse osmosis module to a storage tank (5), and a permeate pump (4) connected to the concentrate line and to the permeate line with a displacement unit (12) and two control channels (112, 113), to be arranged so that two valves (13) and (15) that are controlled alternately by the displacement unit depending on position (12) are integrated into a joint control slide and control channel opening combination (109, 121).

In the small-volume-reverse osmosis system described above, the permeate pump (4) can be formed by a diaphragm pump.

The invention also proposes that the control slide and control channel opening combination present in the above-mentioned small-volume reverse osmosis system should be arranged and/or driven so that both integrated valves are at least partly open at the same time, and can be held in this flushing position.

As a further possible arrangement feature, it is proposed that the above-mentioned small-volume reverse osmosis system be fitted with a flushing line (20) between the two valves, whereby the flushing line (20) bypasses a working chamber provided in the permeate pump.

Similarly, according to the invention, the above-mentioned small-volume reverse osmosis system can be fitted with a control slide and control channel opening combination in such a way, or the combination can be controlled so that both integrated valves are at least partly open at the same time and that the time period of the joint opening can be controlled.

Yields of less than 50% can thereby be set up according to the requirements of the raw water. In this way, a blockage of the reverse osmosis diaphragm in the module at a greater hardness of the raw water can be effectively prevented without too great a loss arising with regard to the good yield according to the present invention.

Similarly, according to the invention, the above-mentioned small-volume reverse osmosis system can be fitted with a control slide and control channel opening combination or the combination can be controlled so that a defined bypass is created at the valve.

According to the invention, a further feature of the above-mentioned small-volume reverse osmosis system could also be that the control slide and control channel opening combination and/or the permeate pump or parts of the permeate pump are integrated into the body of a so-called "Manifold Unit". The expression "Manifold Unit" hereby designates a small-volume-reverse osmosis system in which the major pathways and components are manufactured in a common block as plastic parts, as injection moulded parts and/or are machined from one or more parts. The characteristic of a system of this kind is that there are normally hardly any fittings and line connections between the assembly groups that are otherwise normally present, and that the assembly work is therefore kept small. In addition, the risk of the incorrect connection of the single components is also minimised.

According to the invention, the small-volume reverse osmosis system can also be laid out so that, the permeate pump can be connected to the raw water instead of to the concentrate by choice.

According to the invention, the permeate pump of a small-volume reverse osmosis system can comprise two valves that are alternately driven by the displacement unit depending on the position, and that are integrated into a common control slide and control channel opening combination.

The concentrate flow is shut off at the driving input of the permeate pump while the pump chamber fills. For the transport into the storage area, this valve is opened and the output valve on the drive side is closed.

The concentrate inflow is closed during the filling of the pump chamber. As a result, waste water only then flows in the permeate pump in normal operation when pump output is required. A concentrate regulator to control the flow rate of the concentrate is no longer necessary. The permeate is thereby expelled considerably faster, so that the time period during which the reverse osmosis module is subjected to reverse pressure is shortened.

In this way, the pump will also automatically regulate a yield of around 50%, which is a waste water to permeate ratio of about 1:1 with a type of pulsed flushing, as the flow rate during the work stroke is higher than in state-of-the-art systems. A continuous flow takes place here, which is normally around three times as high as the permeate flow. With small diaphragms, this is often only around 100 ml/min. This often leads to so-called "dead points" on the surface of the diaphragm, as water does not flow everywhere. Pulsating, high overflows can be smaller in volume here, but clean the diaphragm more effectively. This is achieved through correspondingly large valve openings at the control slide and control channel opening combination. In this way, values of more than 1,000 ml/min can be achieved short-term during the ejection phase.

If a yield that is smaller than 50% is necessary due to the corresponding raw water quality, additional waste water can be regulated by a parallel concentrate regulator or by special control of the control slide.

According to the proposal, the outward waste water flow from the permeate pump lies only at the level of the permeate output of the reverse osmosis system. Noise development by the regularly pulsating outgoing concentrate, as is found in the permeate pumps that are currently available on the market, will be largely suppressed through the proposed layout of the reverse osmosis system. Where necessary, the very high yield ratio of 1:1 that is possible with this proposal can be modified, and, for example, a ratio of 1:3 or 1:5 can be set up if, for example, a manufacturer of the diaphragm used in the reverse osmosis module requires a ratio of this kind in order to exclude the possibility of the diaphragm becoming blocked.

An embodiment of the invention will be explained in more detail below on the basis of purely schematic figures. In the figures there is shown FIG. 1 a diagrammatic presentation of a small-volume reverse osmosis system in a simplified execution that can be operated without a supply of electricity.

Figure 2:
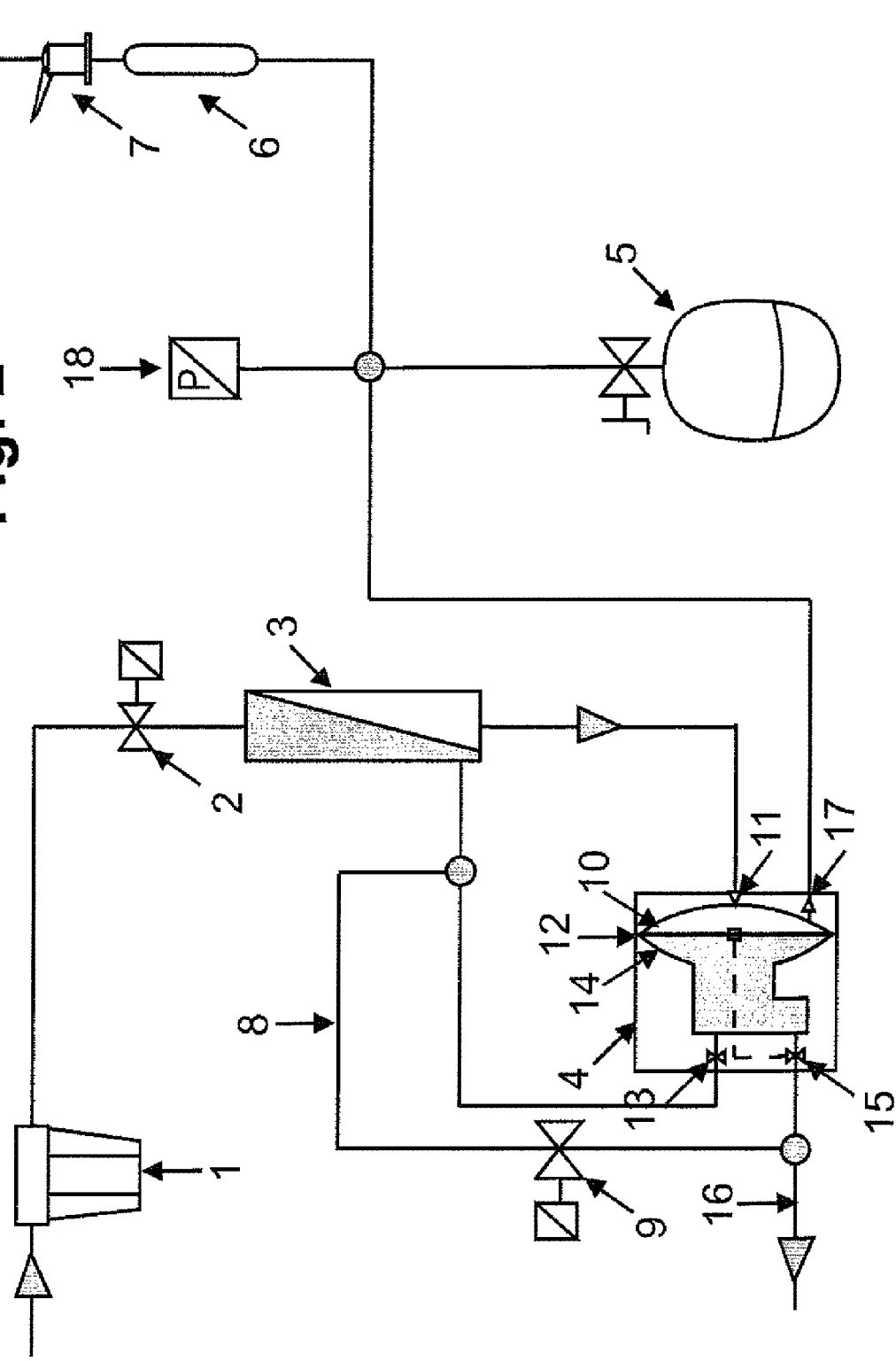

FIG. 2 a diagrammatic presentation of a small-volume reverse osmosis system with an electronically controlled pulsed flushing system.

Figure 3:
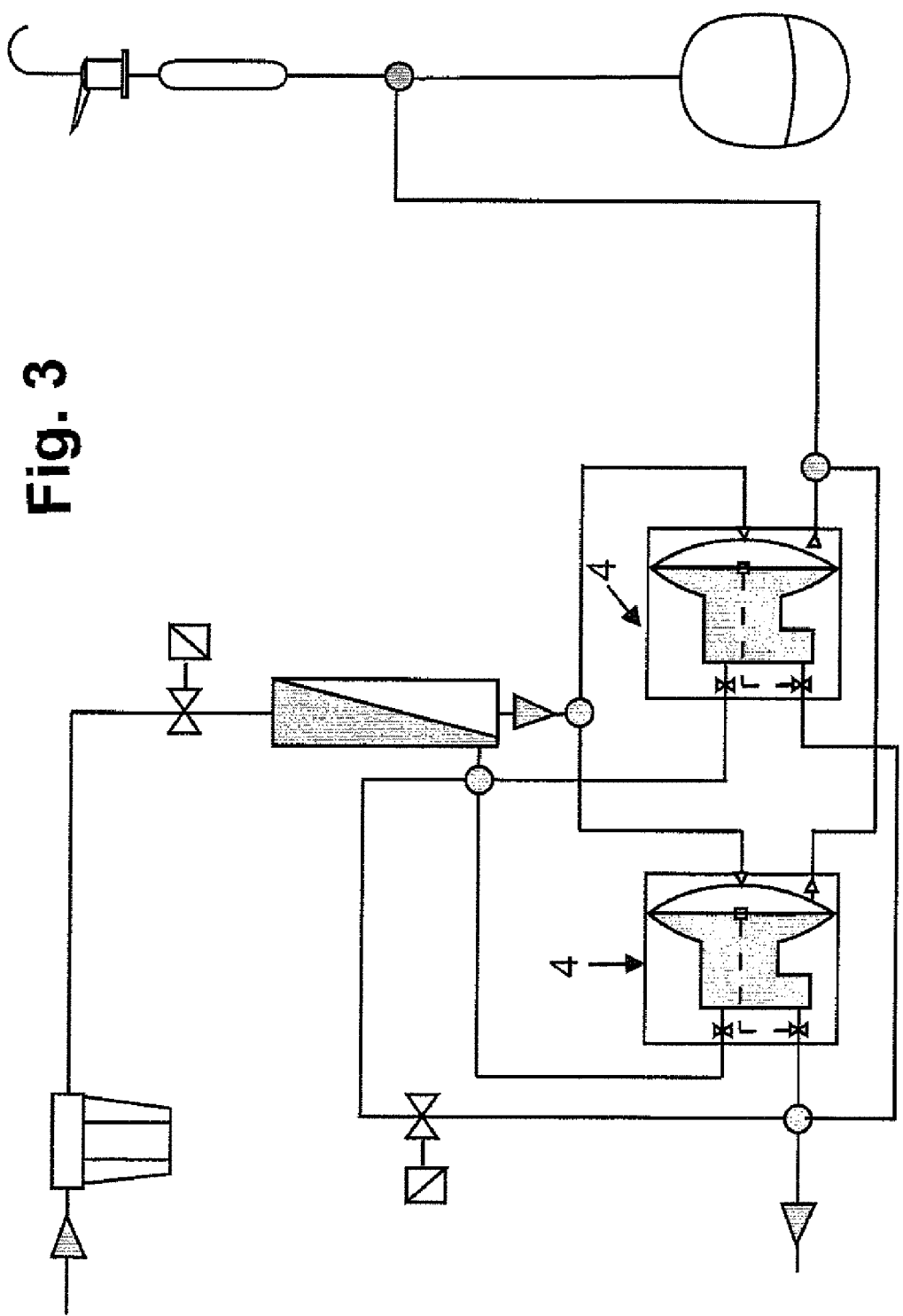

FIG. 3 a diagrammatic presentation of a small-volume reverse osmosis system with two parallel double-valve permeate pumps and an electronically controlled pulsed flushing system.

Figure 4:
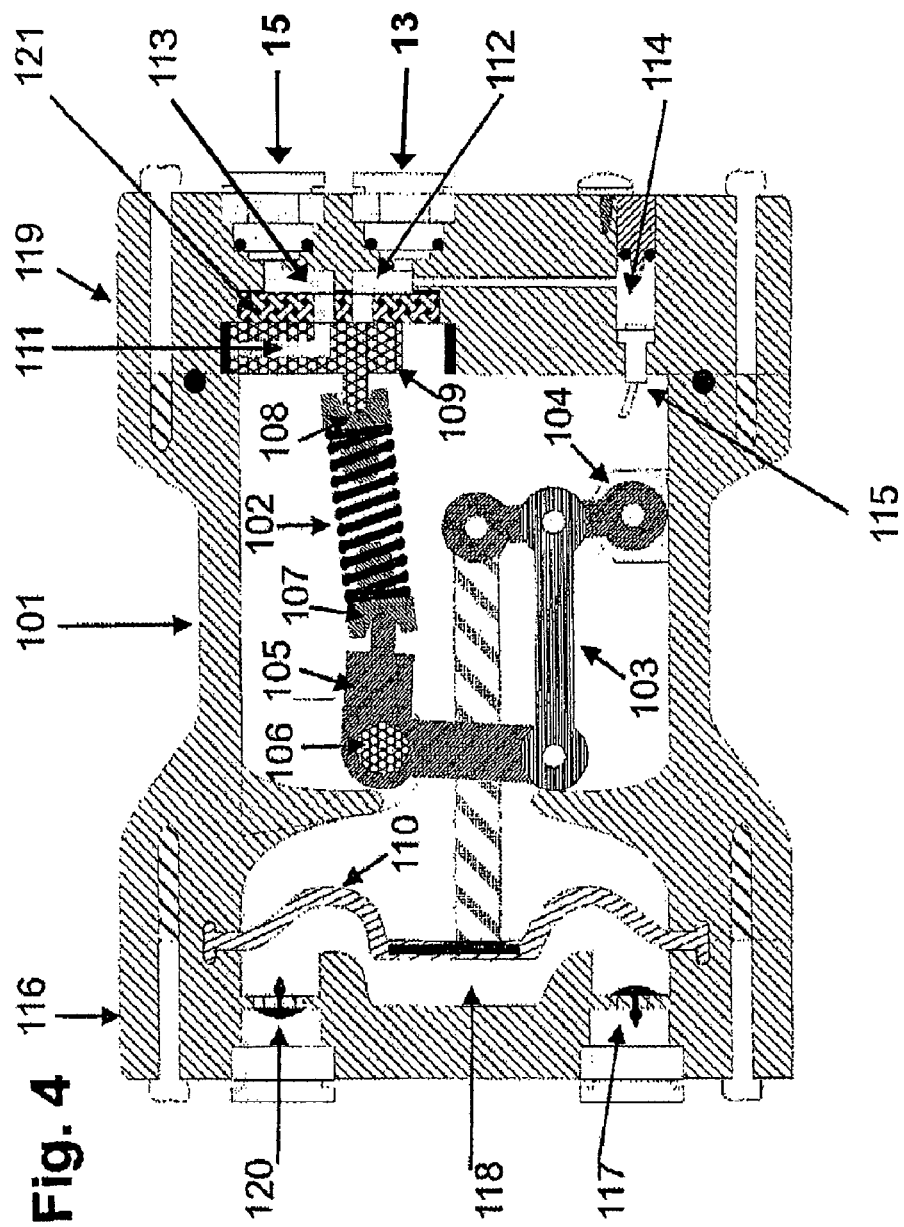

FIG. 4 a detailed view of the area of a double-valve permeate pump such as can be used in a system as shown in FIGS. 1 to 3.

In FIG. 1, reference 1 indicates a preliminary filter into which raw water is fed in the direction indicated by the arrow, for example from a public drinking water supply network. The filtered raw water reaches a hydraulic shut-off valve 2. This valve uses the pressure in the storage tank as a reference for the raw water pressure, and shuts off the water supply to the system when the storage tank has approx. 90% of the line pressure. After a certain volume has been extracted from the storage tank, the valve switches back to open. From here, the raw water makes its way to the reverse osmosis module 3. The permeate that is filtered through the diaphragm in the reverse osmosis module 3 is transported to the storage tank 5 by a permeate pump 4. From there, it can be extracted at extraction tap 7 through the post-filter 6.

The concentrate that accrues from the reverse osmosis module 3 is used for the drive of the permeate pump 4 on the one hand, and on the other hand is led to the waste water through a compensation line 8 and a concentrate regulator 9.

The permeate pump 4 works as follows. The permeate filtered through the diaphragm in the reverse osmosis module 3 fills the permeate chamber 10 of the permeate pump 4 through the pump valve 11, and thereby deflects the diaphragm 12 to the left. Control valve 13 is closed in this phase. The concentrate that is present in the chamber 14 flows through the open valve 15 into the outlet line 16. This process is ended by the switch-over of valves 13 and 15 when the diaphragm 12 is completely deflected to the left. This is achieved by a sensor-controlled link between valves 13 and 15 and the diaphragm 12. As valve 15 is now closed, concentrate flows through the open valve 13 into the concentrate chamber 14 and presses the diaphragm 12 back again.

The permeate that was previously collected in the permeate chamber 10 is pushed into the storage tank 5 through the pump valve 17. This process continues until the diaphragm 12 has deflected to the right, and the majority of the permeate from the permeate chamber 10 has been transported into the storage tank 5. Valves 13 and 15 are now switched over again, and the filling process for the permeate chamber 10 starts again from the beginning.

This process can basically be repeated until the pressure in the storage tank 5 has reached the inlet pressure of the water supply or the feed to the diaphragm module 3 is shut off by the hydraulic shut-off valve 2. As the effective surface area of the diaphragm 12 towards the chambers 10 and 14 is equally large, the same quantity of concentrate will be delivered as of the permeate that is transported to the storage tank 5.

Through the reciprocal switching of the two concentrate valves 13 and 15, the flow of concentrate through the outlet line 16 is heavily limited, as one of the two concentrate valves 13 and 15 is always closed. On the other hand, however, a minimum concentrate flow rate can also be set up without the compensation line 8 and the flow restrictor 9, in that, for example, by the shape and the position of the drilled holes in the valve plate and overlaps with the control contours of the valve slider in connection with the speed control of the valve slider, operational states are possible in which both valve paths are practically open.

The concentrate inlet valve 13 can also be deliberately designed in such a way that it is not completely sealed when closed, but actually allows a certain leakage flow. Optionally, a bypass with a flow restrictor can be connected in parallel to the concentrate inlet valve 13. As a result, concentrate flows through the partly-closed concentrate inlet valve 13 or the bypass and the open concentrate output valve 15 during the filling phase of the permeate chamber 10. During the pump phase, the valves 13 and 15 are switched over, and the whole of the concentrate is available for the drive of the pump.

The leakage flow can also be ensured through the bypass line 8 and a corresponding flow controller 9, whereby the use of this bypass line 8 and the associated flow controller 9 can be waived with economical advantages with the corresponding setting of the concentrate valve 13, or through the use of the internal bypass.

The amount of the above-mentioned leakage flow may, for example, be aligned to the specifications of the manufacturer of the reverse osmosis module or of the diaphragm manufacturer, if, for example, the latter prescribes a specific minimum flow rate, and thereby a prescribed maximum yield, to ensure reliable operation.

In order to flush the reverse osmosis module 3, both concentrate valves 13 and 15 can be opened at the same time as opposed to their basic reciprocal operation, so that a unhindered concentrate flow can take place from the reverse osmosis module to the outlet line 16 in order to flush the reverse osmosis module 3 and the line sections of the system that transport the concentrate.

FIG. 2 divergently describes a reverse osmosis small-volume system in which the hydraulic shut-off valve is replaced by a raw water magnetic valve 2, and the concentrate regulator by a flushing magnetic valve 9, and in which the filling of the storage tanks is controlled through the pressure switch 18 and an electronic system controller.

In order to make a particularly high flow rate possible in a short time to provide a pulsed flushing action, the flushing magnetic valve 9 shown in the flushing line 8 in FIG. 2 can be opened periodically. The concentrate does not have to flow through the permeate pump 4, if, for example, the permeate pump 4 would represent a hindrance to the pulsed flushing due to its flow resistance.

FIG. 3 shows a system in which the supplied raw water is once again pre-cleaned in the preliminary filter 1. Following this, it is fed to the reverse osmosis module 3 through the raw water magnetic valve 2, and, divergently, is then transported from here into the storage tank 5 via 2 permeate pumps 4 switched in parallel.

The advantage of this arrangement is that the two permeate pumps share the work. In addition to the possibility of doubling the performance, there is also the advantage here that, after a short operating time, the pumps never eject permeate simultaneously, and that one of the two permeate pumps 4 is thereby always able to accept permeate. As a result, the production of permeate through the reverse osmosis module 3 is possible without any counter-pressure arising there, which would not be the case during the ejection phase when only using a single permeate pump.

FIG. 4 shows the detailed view of a possible double-valve permeate pump. A main housing 101 supports the switching mechanism, which consists of a spring element 102, an arrangement of levers 103 and 104 and a bell crank 105. The bell crank 105 is supported at the fulcrum 106. The spring element 102 is supported at the fulcrum 107 at the bell crank 105 and at the pivot point 108 of the valve slider 109. Depending on the position of the mobile fulcrum 107 with regard to the fixed fulcrum 106, the spring element deflects the valve slider 109 by the angle to the pivot point 108.

A diaphragm 110 is linked to the bell crank 105 via the levers 103 and 104, whereby the fulcrum 107 changes depending on the position of the diaphragm 110. Via a channel 111 in the control slide 109, the spring element 102 alternately opens a path to either the concentrate inlet 112 or the concentrate outlet 113, thereby controlling the possible running direction of the diaphragm 110. A concentrate flow restrictor 115 is, for example, installed into an optional borehole 114 as a bypass to the concentrate inlet valve 112.

At the pump side, the main housing 101 is closed off by the pump cover 116. The produced permeate finds its way into the pump chamber 118 via the permeate inlet valve 117, which acts as a check valve, and, with the concentrate output valve 113 open and the concentrate inlet valve 112 closed, pushes the diaphragm 110 in the direction of the control housing cover 119. Shortly before the physical end position in the main housing 101, the valve slider 109 is switched over and the concentrate flowing in on the concentrate side pushes the diaphragm 110 back. The permeate that has collected in the permeate chamber 118 will thereby be pushed out of the pump through the permeate outlet valve 120. This work cycle will once again be ended before the physical end position of the diaphragm 110 in the pump cover 116 by the switch-over of the valve slider 109. The filling phase of the permeate chamber 118 starts again from the beginning.

The invention claimed is:

1. Small-volume reverse osmosis system with a reverse osmosis module, a concentrate line leading from the reverse osmosis module to an outlet line, a permeate line leading from the reverse osmosis module to a storage tank, as well as a permeate pump connected to the concentrate line and to the permeate line, the permeate pump having a displacement unit and two control channels, and being characterised in that two valves, a control slide, and a control channel opening are so arranged that the two valves are alternately opened depending on the position of the displacement unit.

2. Small-volume reverse osmosis system according to claim 1, characterised in that the permeate pump is designed as a diaphragm pump.

3. Small-volume reverse osmosis system according to claim 1, characterised in that the control slide and control channel opening are designed to have a flushing position in which both of the two valves are at least partly open at the same time, and the valves can be held in the flushing position.

4. Small-volume reverse osmosis system according to claim 1 characterised by a flushing line between the two valves, whereby the flushing line bypasses one of the working chambers provided in the permeate pump.

5. Small-volume reverse osmosis system according to claim 1 characterised in that the control slide and control channel opening are controllable so that the two valves will be at least partly open at the same time and so that the time periods of the joint opening can be controlled.

6. Small-volume reverse osmosis system according to claim 1 characterised in that the control slide and control channel opening are designed so that a defined bypass is created at the valve.

7. Small-volume reverse osmosis system according to claim 1 characterised in that all components of the permeate pump are contained within a single housing.

8. Small-volume reverse osmosis system according to claim 1 characterised in that the permeate pump can, by choice, be connected to the raw water instead of to the concentrate.

9. Small-volume reverse osmosis system according to claim 2, characterised in that the control slide and control channel opening are designed to have a flushing position in which both of the two valves are at least partly open at the same time, and the two valves can be held in the flushing position.

10. Small-volume reverse osmosis system according to claim 2 characterised by a flushing line between the two valves, whereby the flushing line bypasses one of the working chambers provided in the permeate pump.

11. Small-volume reverse osmosis system according to claim 3 characterised by a flushing line between the two valves, whereby the flushing line bypasses one of the working chambers provided in the permeate pump.

12. Small-volume reverse osmosis system according to claim 9 characterised by a flushing line between the two valves, whereby the flushing line bypasses one of the working chambers provided in the permeate pump.

13. Small-volume reverse osmosis system according to claim 2 characterised in that the control slide and control channel opening are controllable so that the two valves will be at least partly open at the same time and so that the time periods of the joint opening can be controlled.

14. Small-volume reverse osmosis system according to claim 3 characterised in that the control slide and control channel opening are controllable so that the two valves will be at least partly open at the same time and so that the time periods of the joint opening can be controlled.

15. Small-volume reverse osmosis system according to claim 4 characterised in that the control slide and control channel opening are controllable so that the two valves will be at least partly open at the same time and so that the time periods of the joint opening can be controlled.

16. Small-volume reverse osmosis system according to claim 9 characterised in that the control slide and control channel opening are controllable so that the two valves will be at least partly open at the same time and so that the time periods of the joint opening can be controlled.

17. Small-volume reverse osmosis system according to claim 10 characterised in that the control slide and control channel are controllable so that the two valves will be at least partly open at the same time and so that the time periods of the joint opening can be controlled.

18. Small-volume reverse osmosis system according to claim 11 characterised in that the control slide and control channel opening are controllable so that the two valves will be at least partly open at the same time and so that the time periods of the joint opening can be controlled.

19. Small-volume reverse osmosis system according to claim 12 characterised in that the control slide and control channel opening are controllable so that the two valves will be at least partly open at the same time and so that the time periods of the joint opening can be controlled.

* * * * *